(12) United States Patent
Shigehara et al.

(10) Patent No.: US 6,303,745 B1
(45) Date of Patent: Oct. 16, 2001

(54) POLYESTER AND PROCESS FOR PRODUCING THE SAME

(75) Inventors: Kiyotaka Shigehara; Yoshihiro Katayama, both of Tokyo; Seiji Nishikawa; Yasushi Hotta, both of Satte, all of (JP)

(73) Assignees: Cosmo Research Institute; Cosmo Oil Co., Ltd., both of Tokyo (JP)

( * ) Notice: Subject to any disclaimer, the term of this patent is extended or adjusted under 35 U.S.C. 154(b) by 0 days.

(21) Appl. No.: 09/673,782
(22) PCT Filed: Apr. 19, 1999
(86) PCT No.: PCT/JP99/02064
§ 371 Date: Oct. 20, 2000
§ 102(e) Date: Oct. 20, 2000
(87) PCT Pub. No.: WO99/54376
PCT Pub. Date: Oct. 28, 1999

(30) Foreign Application Priority Data

Apr. 20, 1998 (JP) .................................... 10-109181

(51) Int. Cl.$^7$ .................................................. C08G 63/06
(52) U.S. Cl. ..................... 528/361; 528/176; 528/271; 528/272; 528/300; 528/308; 528/403; 528/405
(58) Field of Search ..................... 528/176, 271, 528/272, 300, 308, 361, 403, 405

(56) References Cited

U.S. PATENT DOCUMENTS 4,590,206 * 5/1986 Forrester et al. .................... 514/456

FOREIGN PATENT DOCUMENTS 51-106195 * 9/1976 (JP) .
60-141716 * 7/1985 (JP) .

* cited by examiner

Primary Examiner—Samuel A. Acquah
(74) Attorney, Agent, or Firm—Oblon, Spivak, McClelland, Maier & Neustadt, P.C.

(57) ABSTRACT

A polyester having repeating units represented by formula (1):

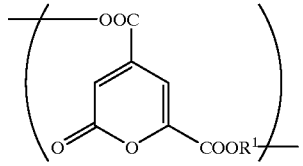

(1)

wherein $R^1$ represents a divalent hydrocarbon residue which in its structure may contain a heteroatom having no active hydrogen. The polyester has a high refractive index and biodegradability, and is useful as a material for fibers and plastics.

5 Claims, No Drawings

POLYESTER AND PROCESS FOR PRODUCING THE SAME

TECHNICAL FIELD

The present invention relates to a polyester which has a high polarity and a high refractive index and which is useful as a material for producing fibers or plastics; to a process for producing the polyester; and to an intermediate for producing the polyester.

BACKGROUND ART

Examples of materials and products prepared from polyesters include polyester fiber such as Tetron, alkyd resin for preparing mechanical parts, and unsaturated polyester resin. These polyesters are widely employed in such applications as general-purpose fiber materials, elastic fiber materials, high-strength fiber materials, and plastics.

However, there is a demand for the development of a polyester that exhibits enhanced properties. One example is swimwear. When white swimwear fabricated with conventional Tetron is worn, the body of the wearer can be seen through the swimwear due to the proximity of the refractive index of water and that of Tetron. Meanwhile, swimwear fabricated with a conventional high-refractive-index polyester is disadvantaged by feeling uncomfortable against the skin and by having an unsatisfactory appearance. Thus, there is a demand for a polyester that can provide a fiber satisfying both a high refractive index and having a good sensation against the skin. In addition, conventional polyester has poor biodegradability, and thus a polyester having improved biodegradability is demanded.

In view of the foregoing, an object of the present invention is to provide a polyester having functions such as a high refractive index, high strength, and biodegradability.

DISCLOSURE OF THE INVENTION

In order to overcome the aforementioned drawbacks, the present inventors have conducted extensive studies on dicarboxylic acids which can serve as raw materials for producing polyesters, and have found that polyesters which are produced by polycondensing 2H-pyran-2-one-4,6- dicarboxylic acid and a variety of diols exhibit high mechanical strength and have a high refractive index and polarity and that a 2H-pyran-2-one ring has excellent biodegradability. The present invention has been accomplished on the basis of these findings.

Accordingly, the present invention provides a polyester having a structural repeating unit represented by formula (1):

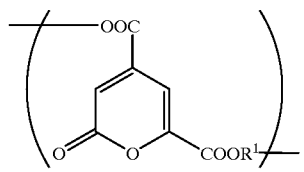

(1)

(wherein $R^1$ represents a divalent hydrocarbon residue optionally having in the structure a heteroatom having no active hydrogen), and a process for producing the same.

The present invention further provides 2H-pyran-2-one-4,6-dicarboxylic acid esters represented by formula (2):

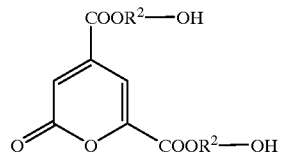

(2)

(wherein $R^2$ represents a C1-C24 divalent hydrocarbon residue). Among the monomers for producing the polyester of the present invention, the above carboxylic acid esters are novel compounds.

BEST MODES FOR CARRYING OUT THE INVENTION $R^1$ in the structural repeating unit represented by formula (1) for constituting the polyester of the present invention represents a divalent hydrocarbon residue optionally having in the structure a heteroatom having no active hydrogen. Among divalent hydrocarbon residues, preferred are $R^2$, $R^2-(OR^2)_l-$, and $R^2-OCO-R^2$ (wherein $R^2$ is a C1–C24 divalent hydrocarbon residue and l is a number between 1 and 4. Examples of preferred $R^2$ include a C1–C24 linear chain or branched chain alkylene group, a C3–C8 cycloalkane divalent residue, a C5–C10 aromatic hydrocarbon divalent residue, a C7–C24 aralkyl divalent residue, and a C8–C24 alkylarylalkyl divalent residue. Examples of more preferred $R^2$ include an ethylene group, a trimethylene group, a propylene group, a tetramethylene group, a hexamethylene group, an octamethylene group, a decamethylene group, a dodecamethylene group, a phenylene group, a tolylene group, a xylylene group, a naphthalene group, a cyclohexylene group, and $-CH_2CH_2(OCH_2CH_2)_2-$. These hydrocarbon residues may have a substituent having no active hydrogen such as an alkoxy (preferably C1–C6) group, an alkanoyl (preferably C2–C6) group, an alkyl (preferably C1–C6) group, an aryl (preferably C6–C14) group, or an aralkyl (preferably C7–C18) group.

The polyester of the present invention may further contain another structural repeating unit such as $-(OCO-R^3-COO-R^1)-$ so long as the polyester contains a structural repeating unit represented by the aforementioned formula (1). Such a polyester is represented by formula (3) as described below:

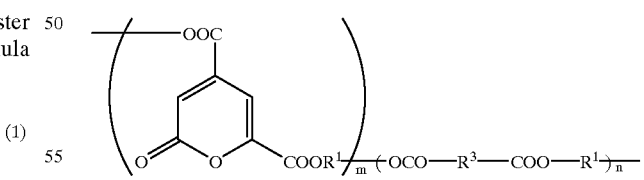

(3)

(wherein $R^3$ represents a divalent hydrocarbon residue optionally having in the structure a heteroatom having no active hydrogen; m and n are integers; and $R^1$ is the same as defined above).

The polyester which is represented by formula (3) and has two types of structural repeating units may be a block copolymer or a random copolymer.

No particular limitation is imposed on the molecular weight of the polyester of the present invention, and it varies in accordance with use. Typically, the molecular weight based on the number average molecular weight is preferably 10,000–200,000, more preferably 20,000–150,000. The molecular weight is particularly preferably 40,000–100,000 in view of readiness in preparation of a melt thereof, mold ability from the melt, and development of physical properties such as mechanical strength of molded products.

The polyester of the present invention may be produced according to any one of Reaction schemes 1 to 3:

Reaction scheme 1

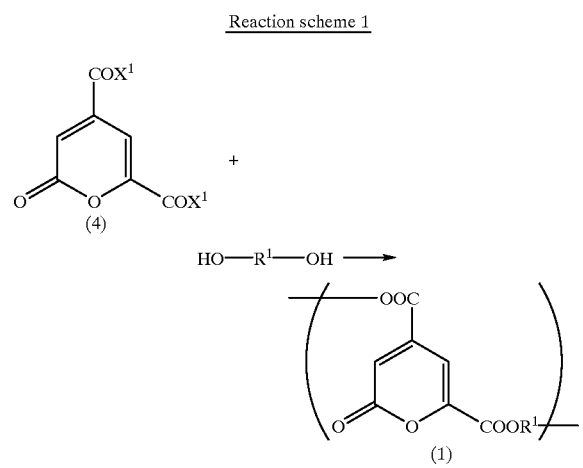

(wherein $X^1$ represents an alkoxy group or a halogen atom; and $R^1$ is the same as defined above).

Specifically, a 2H-pyran-2-one-4,6-dicarboxylic acid derivative (4) and a diol (HO—$R^1$—OH) or an alkali metal compound thereof are subjected to polycondensation reaction, to thereby produce the polyester of the present invention (1).

Among dicarboxylic monomers (4), a monomer in which $X^1$ is an alkoxy group and a monomer in which $X^1$ is a halogen atom are novel compounds. The compounds can be produced by converting 2H-pyran-2-one-4,6-dicarboxylic acid represented by formula (4) (wherein X is OH) to an ester or an acid halide thereof through a customary method. Among alkoxy groups for $X^1$, a lower alkoxy group is preferred, with a C1–C6 alkoxy group being particularly preferred in view of reactivity to diols. Among halogen atoms, a chlorine atom and a bromine atom are preferred.

Appropriate types of polycondensation may be employed in accordance with dicarboxylic species (4). For example, alcohol-removing-polycondensation is preferably employed when a dicarboxylic derivative (4) in which $X^1$ is an alkoxyl group is used and polycondensation is preferably employed when a dicarboxylic derivative (4) in which $X^2$ is a halogen atom is used.

In alcohol-removing-polycondensation, for example, a dicarboxylic acid diester (4) and a diol are mixed at a mol ratio of approximately 1:1, and the mixture is heated.

In polycondensation, for example, a dicarboxylic acid halide (4) and a diol or an alkali metal compound thereof are mixed at a mol ratio of approximately 1:1, and the mixture is heated in an appropriate mixture. Examples of preferred alkali metal compounds include sodium dialcolate.

When the aforementioned polycondensation is carried out by use of $HOCOR^3COOH$ or a reactive derivative thereof in addition to HO—$R^1$—OH, the following copolymer represented by formula (3) can be obtained.

Reaction scheme 2

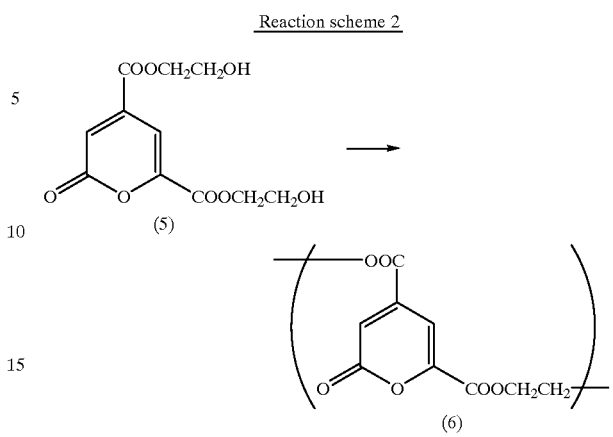

Specifically, a 2H-pyran-2-one-4,6-dicarboxylic acid ester represented by formula (5) is homo-polycondensed while removing ethylene glycol to thereby produce a polyester having a structural repeating unit represented by formula (6).

In the reaction, for example, a compound (5) is reacted in the absence of a solvent but in the presence of calcium carbonate and diantimony trioxide, each inorganic compound being added in an amount of 1/10–1/100, preferably 1/20–1/80, more preferably 1/40–1/60 parts by weight. During the initial period in which ethylene glycol generates vigorously, the temperature of polycondensation is regulated to approximately 180° C. When generation of ethylene glycol becomes weak, homo-polycondensation is carried out at approximately 240C:

Reaction scheme 3

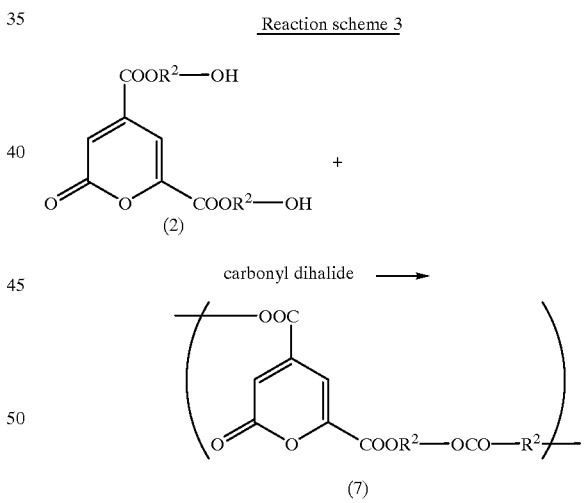

(wherein $R^2$ is the same as defined above).

Specifically, a diester represented by formula (2) and a carbonyl dihalide or a derivative thereof are subjected to polycondensation reaction, to thereby yield a polyester represented by formula (7).

Examples of carbonyl dihalides employed in the reaction include phosgene, and examples of derivatives thereof include diphosgene.

The polycondensation is carried out in an appropriate solvent in the presence of a base such as triethylamine at 0° C. to room temperature.

A variety of additives may optionally be added to the polyester of the present invention. Examples of additives include an anti-oxidant, a colorant, a UV-absorber, a light stabilizer, a silane coupling agent, a storage stabilizer, a plasticizer, a lubricant, a solvent, a filler, an anti-aging agent, a wettability-modifier, and a coatability-modifier.

In the thus-obtained polyesters of the present invention, a 2H-pyran-2-one ring structure imparts rigidity to the polyesters. The polyesters may have a repeating unit combination of "rigid ring unit-soft aliphatic chain unit" or that of "rigid ring unit-rigid aromatic group unit" by selecting $R^1$. The polyesters having such a structure serve as materials having a wide range of physical properties and are useful as soft, elastic, or high-strength fibers and plastics. In addition, since the 2H-pyran-2-one ring has a high polarity and refractive index, the polyesters of the present invention obtained therefrom also have a high polarity and refractive index and are applicable to fiber for cloth. Furthermore, the 2H-pyran-2-one ring is found in an intermediate product during biodegradation of lignin by wild-type bacteria and is further degraded in soil to produce carbon dioxide and water. Thus, the polyesters of the present invention undergo rapid biodegradation by lignin-degrading wild-type bacteria in soil.

EXAMPLES

The present invention will next be described in more detail by way of examples, which should not be construed as limiting the invention thereto.

Example 1

In acetonitrile (100 mL), 2H-pyran-2-one-4,6-dicarboxylic acid (hereinafter abbreviated as PDC) (10 g) was dissolved. A mixture of the solution and oxalic dichloride (20 mL) was allowed to react at room temperature for 20 hours. The reaction mixture was dried under reduced pressure and purified through sublimation at 120° C. and approximately 0.1 mmHg, to thereby produce 8.2 g of a corresponding acid chloride, 2H-pyran-2-one-4,6-dicarboxylic dichloride (hereinafter abbreviated as PDC chloride), in the form of white needle-like crystals.

($^1$H-NMR: in $d_3$-acetonitrile) PDC: 7.1, 7.4 (proton ring), 1.43 (—COOH), PDC chloride: 7.4, 7.6 (proton ring) ($^{13}$C-NMR: in $d_3$-acetonitrile) PDC: 145, 152 (>C—COOH), 108, 122 (ring carbon, unsubstituted), 161, 165, (carbonyl and —COOH), PDC chloride: 145, 150 (>C—COOH), 110, 128 (ring carbon, unsubstituted), 164 (ketone), 157, 160 (—COCl) ppm. (IR) PDC: 3400 (—COQH), 1730 (ketone and carboxylic acid), PDC chloride: 1730 (ketone), 1750 (—COCl), 720 (C—Cl) cm$^{-1}$.

Example 2

PDC (10 g) was dissolved in methanol (500 mL), and concentrated hydrochloric acid (1 mL) was added to the solution. The resultant mixture was refluxed by boiling for 24 hours, and then concentrated to 50 mL at ambient temperature under reduced pressure. Chloroform (300 mL) was added to the mixture. The resultant mixture was cooled with ice, and precipitated unreacted PDC was removed through filtration. The filtrate was partitioned by shaking with a 0.5% aqueous solution (100 mL) of sodium bicarbonate and subsequently twice with water (300 mL). The separated chloroform solution was dried over anhydrous sodium sulfate, filtered, and brought to dryness under reduced pressure, to thereby obtain 7.8 g of dimethyl 2H-pyran-2-one-4,6-dicarboxylate (hereinafter abbreviated as PDCM).

($^1$H-NMR: in CDCl$_3$) 7.15, 7.5 (proton ring), 3.96 (methyl) ($^{13}$C-NMR: in CDCl$_3$) 54 (methyl), 142, 150 (>C-COOCH$_3$), 108, 122 (ring carbon, unsubstituted), 163 (ketone), 160 (—COO—) ppm. (IR) 1730 (ketone), 1750 (ester carbonyl), 1100, 1280 (—C—O—C).

Example 3

PDCM (2.0 g, 9.43 mmol), ethylene glycol (50 mL), and p-toluenesulfonic acid (50 mg) were heated with stirring to 180° C. and the mixture was allowed to react for 5 hours while removing by-produced methanol through distillation. Excessive ethylene glycol was removed through distillation under reduced pressure as much as possible, and chloroform (50 mL) was added to the residue. The mixture was washed three times with a saturated aqueous solution (100 mL) of NaCl. After the separated chloroform phase was dried over anhydrous sodium sulfate, the solvent was removed through distillation under reduced pressure, to thereby obtain 2.31 g (yield: approximately 91%) of di(2-hydroxyethyl) 2H-pyran-2-one-4,6-dicarboxylate (hereinafter abbreviated as PDCHE), as viscous liquid.

($^1$H-NMR: in CDCl$_3$) 7.15, 7.5 (proton ring), 4.61, 4.32 (methylene) ($^{13}$C-NMR: in CDCl$_3$) 64.69 (methylene), 142, 150 (>—COO—), 108, 122 (ring carbon, unsubstituted), 163 (ketone), 160 (—COO—) ppm. (IR) 1730 (ketone), 1750 (ester carbonyl), 1100, 1280 (—C—O—C).

Example 4

PDC (2.00 g, 10.87 mmol), propylene oxide (2.56 g, 43.48 mmol), and benzyl trimethylammonium trichloride (0.10 g) were dissolved in methanol (75 mL), and the mixture was allowed to react for 12 hours with stirring at room temperature. Subsequently, the procedure of Example 3 was repeated, to thereby obtain 2.25 g (yield: approximately 69%) of di(2-hydroxypropyl) 2H-pyran-2-one-4,6-dicarboxylate (hereinafter abbreviated as PDCHP).

($^1$H-NMR: in CDCl$_3$) 6.52, 7.06 (proton ring), 4.93 (methine), 4.50 (methylene), 1.45 (methyl) ($^{13}$C-NMR: in CDCl$_3$) 18.5 (methyl), 68.5 (methylene), 71.4 (methine), 141.2, 146.5 (>C—COO—), 129.5, 134.5 (ring carbon, unsubstituted), 159.4 (ketone), 163.2 (—COO—) ppm. (IR) 1731 (ketone), 1748 (ester carbonyl), 1097, 1276 (—C—O—C).

Example 5

The procedure of Example 4 was repeated except that PDC (2.00 g, 10.87 mmol) and styrene oxide (3.91 g, 32.61 mmol) were used, to thereby obtain 3.15 g (yield: approximately 68%) of di(2-hydroxy-2-phenylethyl) 2H-pyran-2-one-4,6-dicarboxylate (hereinafter abbreviated as PDCPE).

(1H-NMR: in CDCl$_3$) 6.52, 7.06 (proton, PDC ring), 7.16–7.35 (proton, benzene ring), 5.45 (methine), 4.51 (methylene) ($^{13}$C-NMR: in CDCl$_3$) 163.1, 166.5 (>C—COO—), 159 (ketone), 128.5, 134.6 (ring carbon, unsubstituted), 141.1 (substituted phenyl), 126.1–128.3 (other phenyl), 76 (methine), 68 (methylene) ppm. (IR) 1733 (ketone), 1752 (ester carbonyl), 1102, 1284 (—C—O—C).

Example 6

The procedure of Example 4 was repeated except that PDC (2.00 g, 10.87 mmol) and cyclohexane oxide (3.20 g, 32.61 mmol) were used, to thereby obtain 3.53 g (yield: approximately 85%) of di(2-hydroxy-cyclohexylyl) 2H-pyran-2-one-4,6-dicarboxylate (hereinafter abbreviated as PDCHC).

($^1$H-NMR: in CDCl$_3$) 6.51, 7.06 (proton, PDC ring), 4.88, 4.21 (proton, substituted cyclo ring), 1.40 - 1.83 (other methylene, cyclo ring) ($^{13}$C-NMR: in CDCl$_3$) 161, 165 (>C—COO—), 125, 135 (ring carbon, unsubstituted), 159 (ketone), 71, 72 (carbon, substituted cyclo ring), 21–30 (other carbon, cyclo ring) ppm. (IR) 1730 (ketone), 1750 (ester carbonyl), 1101, 1282 (—C—O—C).

Example 7

PDC chloride (2.00 g, 9.04 mmol) was dissolved in chloroform (30 mL). To the solution, a chloroform solution (20 mL) of 1,4-butanediol (0.814 g, 9.04 mmol) and triethylamine (0.915 g, 9.04 mmol) was added dropwise at 5° C., and the mixture was allowed to react with stirring for one day. The resultant solution was added dropwise into a large amount of a methanol/water (99/1) solvent mixture. A precipitated white powder was collected and dried, to thereby obtain 2.21 g of a polyester represented by formula (1) in which R$^1$ was —(CH$_2$)$_4$—.

($^1$H-NMR: in CDCl$_3$) 6.51, 7.06 (proton ring), 4.12 (a-methylene), 1.61 (β-methylene) ($^{13}$C_NMR: in CDCl$_3$) 163, 166 (>C—COO—), 135, 143 (ring carbon, unsubstituted), 159 (ketone), 65 (a-methylene), 25 (β-methylene) ppm. (IR) 1734 (ketone), 1750 (ester carbonyl), 1102, 1284 (—C—O—C).

The number average molecular weight was 46,800, as measured by means of GPC by use of polystyrene as a standard sample.

Example 8

The procedure of Example 1 was repeated, except that ethylene glycol (0.561 g, 9.04 mmol) was used instead of 1,4-butanediol, to thereby obtain 2.13 g of a polyester represented by formula (1) in which R$^1$ was —(CH$_2$)$_2$—, as white powder.

($^1$H-NMR: in CDCl$_3$) 6.51, 7.06 (proton ring), 4.61 (methylene) ($^{13}$C-NMR: in CDCl$_3$) 163, 166 (>—COO—), 135, 143 (ring carbon, unsubstituted), 159 (ketone), 66 (methylene) ppm. (IR) 1732 (ketone), 1750 (ester carbonyl), 1102, 1284 (—C—O—C).

The number average molecular weight was 34,400, as measured by means of GPC by use of polystyrene as a standard sample.

Example 9

The procedure of Example 1 was repeated, except that 1,6-hexanediol (1.07 g, 9.04 mmol) was used instead of 1,4-butanediol, to thereby obtain 3.26 g of a polyester represented by formula (1) in which R$^1$ was —(CH$_2$)$_6$—, as white powder.

($^1$H-NMR: in CDCl$_3$) 6.52, 7.06 (proton ring), 4.18 (α-methylene), 1.38(βmethylene), 1.31 (γmethylene) ($^{13}$C-NMR: in CDCl$_3$) 163, 167 (>C—COO—), 135, 143 (ring carbon, unsubstituted), 161 (ketone), 65.4 (0-methylene), 26.0–28.6 (other methylene) ppm. (IR) 1732 (ketone), 1750 (ester carbonyl), 1102, 1284 (—C—O—C).

The number average molecular weight was 36,600, as measured by means of GPC by use of polystyrene as a standard sample.

Example 10

The procedure of Example 1 was repeated, except that acetonitrile was employed as a solvent, and instead of 1,4-butanediol, an acetonitrile solution (50 mL) of p-hydroquinone (1.95 g, 9.04 mmol) and triethylamine (0.914 g, 9.04 mmol) was added dropwise over one hour under ice-cooling, to thereby obtain 3.12 g of a polyester represented by formula (1) in which R$^1$ was -p-phenylene, as white powder.

($^1$H-NMR: in CDCl$_3$) 6.52, 7.06 (proton, PDC ring), 7.23, 7.38 (proton, phenyl ring) ($^{13}$C-NMR: in CDCl$_3$) 163, 167 (>C—COO—), 135, 143 (ring carbon, unsubstituted), 161 (ketone), 148 (phenyl carbon, substituted), 123 (phenyl carbon, unsubstituted) ppm. (IR) 1728 (ketone), 1748 (ester carbonyl), 1605, 1495 (phenyl), 1102, 1284 (—C—O—C).

The number average molecular weight was 37,100, as measured by means of GPC by use of polystyrene as a standard sample.

Example 11

The procedure of Example 10 was repeated except that p-xylylenediol (1.031 g, 9.04 mmol) was used, to thereby obtain 2.57 g of a polyester represented by formula (1) in which R$^1$ was —(p—CH$_2$—C$_6$H$_4$—CH$_2$)—, as white powder. ($^1$H-NMR: in CDCl$_3$) 6.52, 7.06 (proton, PDC ring), 6.93, 6.95 (proton, phenyl ring), 5.25 (methylene) ($^{13}$C-NMR: in CDCl$_3$) 163, 167 (>C—COO—), 135, 143 (PDC ring carbon, unsubstituted), 161 (ketone), 136.5 (phenyl carbon, substituted), 132 (phenyl carbon, unsubstituted), 67.6 (methylene) ppm. (IR) 1732 (ketone), 1751 (ester carbonyl), 1606, 1495 (phenyl), 1100, 1280 (—C—O—C).

The number average molecular weight was 42,200, as measured by means of GPC by use of polystyrene as a standard sample.

Example 12

To a solution of PDCHE (2.00 g, 7.35 mmol) in chloroform (30 mL), a chloroform solution (20 mL) of phosgene (0.728 g, 7.35 mmol) and triethylamine (0.744 g, 7.35 mmol) was added dropwise, and the mixture was allowed to react with stirring at 5° C. for 12 hours and subsequently at room temperature for one day. The resultant solution was added dropwise into a large amount of methanol. A precipitated white powder was collected through filtration and dried, to thereby obtain 2.08 g of a polyester represented by formula (1) in which R$^1$ was —CH$_2$CH$_2$—OC(=O)O—CH$_2$CH$_2$—, as white powder. ($^1$H-NMR: in CDCl$_3$) 6.52, 7.06 (proton, PDC ring), 4.25, 4.60 (methylene) ($^{13}$C-NMR: in CDCl$_3$) 163, 167 (>C—COO—), 135, 143 (PDC ring carbon, unsubstituted), 161 (ketone, PDC ring), 155 (carbon, carbonate), 65.5, 67.5 (methylene) ppm. (IR) 1730 (ketone, PDC ring and ketone carbonate), 1750 (ester carbonyl), 1100, 1280 (—C—O—C).

The number average molecular weight was 44,200, as measured by means of GPC by use of polystyrene as a standard sample.

Example 13

The procedure of Example 12 was repeated except that a chloroform solution (30 mL) of PDCHP (2.21 g, 7.35 mmol) was used, to thereby obtain 2.37 g of a polyester represented by formula (1) in which R$^1$ was —CH$_2$CH(CH$_3$)—OC(=O) O—CH(CH$_3$)CH$_2$—, as white powder. ($^1$H-NMR: in CDCl$_3$) 6.52, 7.06 (proton, PDC ring), 4.98 (methine), 4.34, 4.52 (methylene), 1.43 (methyl) ($^{13}$C-NMR: in CDCl$_3$) 163, 167 (>C—COO—), 135, 143 (PDC ring carbon, unsubstituted), 161 (ketone, PDC ring), 154.7 (carbon carbonate), 71.5 (methine) 68.5 (methylene), 18.5 (methyl) ppm. (IR) 1730 (ketone PDC ring and ketone carbonate), 1750 (ester carbonyl), 1100, 1280 (—C—O—C).

The number average molecular weight was 42,500, as measured by means of GPC by use of polystyrene as a standard sample.

Example 14

The procedure of Example 12 was repeated except that a chloroform solution of PDCPE (2.79 g, 7.35 mmol) was used, to thereby obtain 2.84 g of a polyester represented by formula (1) in which $R^1$ was -(phenylethylene)-OC(=O) O—(phenylethylene), as white powder. ($^1$H-NMR: in CDCl$_3$) 6.52, 7.06 (proton, PDC ring), 7.35, 7.30, 7.16 (proton, phenyl ring), 5.48 (methine), 4.6, 4.5 (methylene) ($^{13}$C-NMR: in CDCl$_3$) 150, 141 (>—COO—), 135, 129 (PDC ring carbon, unsubstituted), 159 (ketone, PDC ring), 155 (carbon, carbonate), 141 (phenyl carbon, substituted), 128, 127, 126 (phenyl carbon, unsubstituted), 76.2 (methine), 67.8 (methylene) ppm. (IR) 1730 (ketone ring and ketone carbonate), 1750 (ester carbonyl), 1605, 1498 (phenyl ring), 1100, 1280 (—C—O—C).

The number average molecular weight was 37,500, as measured by means of GPC by use of polystyrene as a standard sample.

Example 15

The procedure of Example 12 was repeated except that a chloroform solution of PDCHC (3.12 g, 7.35 mmol) was used, to thereby obtain 2.77 g of a polyester represented by formula (1) in which $R^1$ was -(1,2-cyclohexylene)-OC (=O)O-(1,2-cyclohexylene), as white powder. ($^1$H-NMR: in CDCl$_3$) 6.51, 7.06 (proton, PDC ring), 4.98 (methine), 4.34, 4.52 (methylene), 1.43 (methyl) ($^{13}$C-NMR: in CDCl$_3$) 163, 167 (>C—COO—), 135, 143 (ring carbon, unsubstituted), 161 (ketone ring), 154.7 (carbon carbonate), 71.5 (methine), 68.5 (methylene), 18.5 (methyl) ppm. (IR) 1730 (ketone ring and ketone carbonate), 1750 (ester carbonyl), 1100, 1280 (—C—O—C).

The number average molecular weight was 42,500, as measured by means of GPC by use of polystyrene as a standard sample.

Example 16

Calcium carbonate (0.1 g) and diantimony trioxide (0.1 g) were added to PDCHE (5.0 g), and homo-polycondensation was carried out at 180° C. for two hours and subsequently at 240° C. for eight hours while removing generated ethylene glycol vapor. After the reaction mixture was cooled, a solid was taken through extraction by use of chloroform, and the residue was removed through filtration. The filtrate was added dropwise into a large amount of methanol. The thus-obtained white powder was collected through filtration, to thereby obtain 4.35 g of a polyester represented by formula (1) in which $R^1$ was —(CH$_2$)$_2$—, as white powder.

The polyester had the same structure as that obtained in Example 2, and analyses through NMR and IR showed the same results.

The number average molecular weight was 94,500, as measured by means of GPC by use of polystyrene as a standard sample.

INDUSTRIAL APPLICABILITY

The present invention provides a polyester having a high refractive index and biodegradability and are useful as soft, elastic, or high-strength fibers and plastics.

What is claimed is:

1. A polyester having a structural repeating unit represented by formula (1):

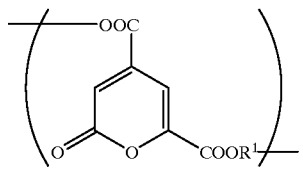

(1)

(wherein $R^1$ represents a divalent hydrocarbon residue optionally having in the structure a heteroatom having no active hydrogen).

2. A 2H-pyran-2-one-4,6-dicarboxylic acid ester represented by formula (2):

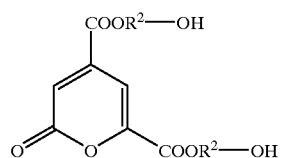

(2)

(wherein $R^2$ represents a C1–C24 divalent hydrocarbon residue).

3. A process for producing a polyester as described in claim 1, which process comprises polycondensation of a 2H-pyran-2-one-4,6-dicarboxylic acid represented by formula (4):

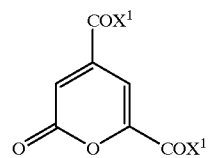

(4)

(wherein $X^1$ represents an alkoxy group or a halogen atom) and a diol represented by HO-$R^1$-OH (wherein $R^1$ represents a divalent hydrocarbon residue optionally having in the structure a heteroatom having no active hydrogen) or an alkali metal compound thereof.

4. A process for producing a polyester having a structural repeating unit represented by formula (6):

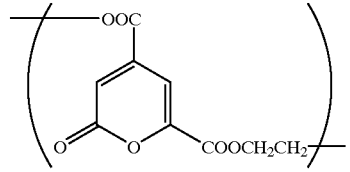

(6)

characterized by subjecting a 2H-pyran-2-one-4,6-dicarboxylic acid ester represented by formula (5):

(5)

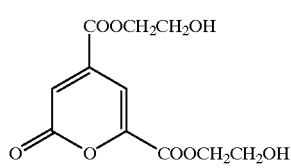

to homo-polycondensation while removing ethylene glycol.

5. A process for producing a polyester of formula (7):

(7)

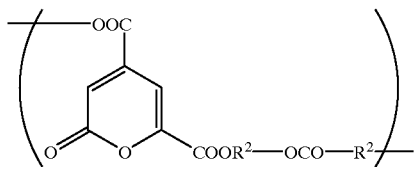

(wherein $R^2$ represents a C1–C24 divalent hydrocarbon residue), characterized by subjecting a 2H-pyran-2-one-4,6-dicarboxylic acid ester represented by formula (2):

(2)

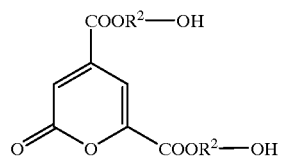

(wherein $R^2$ has the same meaning as described above) and carbonyl dihalide or a derivative thereof to polycondensation reaction.

* * * * *